US011394546B2

(12) United States Patent
Leiserson (10) Patent No.: US 11,394,546 B2
(45) Date of Patent: Jul. 19, 2022

(54) ENCRYPTED DATA KEY MANAGEMENT (71) Applicant: Fortanix, Inc., Mountain View, CA (US)

(72) Inventor: Andrew Leiserson, San Francisco, CA (US)

(73) Assignee: Fortanix, Inc., Mountain View, CA (US)

( * ) Notice: Subject to any disclaimer, the term of this patent is extended or adjusted under 35 U.S.C. 154(b) by 217 days.

(21) Appl. No.: 16/600,273

(22) Filed: Oct. 11, 2019

(65) Prior Publication Data

US 2021/0111886 A1    Apr. 15, 2021

(51) Int. Cl.
| H04L 29/06 | (2006.01) |
| H04L 9/16 | (2006.01) |
| G06F 21/60 | (2013.01) |
| G06F 16/13 | (2019.01) |
| H04L 9/32 | (2006.01) |

(52) U.S. Cl.
CPC ............... *H04L 9/16* (2013.01); *G06F 16/13* (2019.01); *G06F 21/602* (2013.01); *H04L 9/3247* (2013.01)

(58) Field of Classification Search
CPC ....... H04L 9/16; H04L 9/3247; G06F 21/602; G06F 21/13; G06F 16/13
See application file for complete search history.

(56) References Cited

U.S. PATENT DOCUMENTS

| 9,037,870 | B1* | 5/2015 | Zheng | G06F 12/1466 |
| | | | | 380/42 |
| 9,584,517 | B1* | 2/2017 | Roth | G06F 21/602 |
| 2008/0123858 | A1* | 5/2008 | Perlman | G06F 21/6209 |
| | | | | 380/278 |
| 2011/0252234 | A1* | 10/2011 | De Atley | H04L 9/3226 |
| | | | | 713/165 |
| 2012/0204028 | A1* | 8/2012 | Banerjee | H04L 63/20 |
| | | | | 380/279 |
| 2017/0180123 | A1* | 6/2017 | Simon | H04L 9/14 |
| 2017/0357817 | A1* | 12/2017 | Tamura | H04L 9/0822 |
| 2018/0063105 | A1* | 3/2018 | Poon | H04L 9/14 |
| 2018/0167220 | A1* | 6/2018 | Levy | H04L 9/3247 |
| 2019/0138621 | A1* | 5/2019 | Tobias | H04L 9/14 |
| 2019/0286577 | A1* | 9/2019 | Leitao | G06F 9/544 |

(Continued)

OTHER PUBLICATIONS

Chiraphat Chaiphet et al., Secure Enclave for TLS Web Server on Untrusted Environment, Nov. 2017, ACM, pp. 27-31. (Year: 2017).*

(Continued)

*Primary Examiner* — Luu T Pham
*Assistant Examiner* — Fahimeh Mohammadi
(74) *Attorney, Agent, or Firm* — Lowenstein Sandler LLP (57) ABSTRACT

An encrypted file system key associated with a first secure enclave may be received. A request from a second secure enclave to access a file system associated with the encrypted file system key may be received. In response to receiving the request, the encrypted file system key may be decrypted with a cryptographic key associated with an enclave manager to obtain a file system key. The file system key may be encrypted based on another cryptographic key associated with the second secure enclave to generate a re-encrypted file system key. Furthermore, the re-encrypted file system key may be provided to the second secure enclave.

17 Claims, 6 Drawing Sheets

(56) References Cited

U.S. PATENT DOCUMENTS

| | | | |
|---|---|---|---|
| 2019/0394034 A1* | 12/2019 | Aschauer | H04L 9/0877 |
| 2020/0057566 A1* | 2/2020 | Ben Dayan | G06F 3/0619 |
| 2020/0304299 A1* | 9/2020 | Medvinsky | H04L 9/3234 |
| 2021/0034750 A1* | 2/2021 | Claes | G06F 21/725 |
| 2021/0119793 A1* | 4/2021 | Gaddam | H04L 9/16 |

OTHER PUBLICATIONS

Stefan Ludwig et al., File System Encryption with Integrated User Management, Oct. 2001, ACM, vol. 35,Issue 4, pp. 88-93. (Year: 2001).*

Judicael B. Djoko et al., NEXUS: Practical and Secure Access Control on Untrusted Storage Platforms using Client-side SGX, Aug. 22, 2019, IEEE, pp. 401-413. (Year: 2019).*

Istvan Lam et al., Tresorium: cryptographic file system for dynamic groups over untrusted cloud storage, Oct. 25, 2012, IEEE, pp. 296-303. (Year: 2012).*

\* cited by examiner

ENCRYPTED DATA KEY MANAGEMENT

TECHNICAL FIELD

Aspects of the present disclosure relate generally to key management, and more specifically, relate to encrypted data key management.

BACKGROUND

Data may be securely stored by encrypting the data at a storage resource. An application may later utilize or operate upon the data that has been stored at the storage resource. For example, the application may retrieve a cryptographic key that may be used to decrypt the encrypted data. After performing the decryption operation with the retrieved cryptographic key, the data may then be utilized and operated upon by the application. Subsequently, when the application no longer operates on the data, the data may be encrypted again and stored at the storage resource.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure relate to encrypted data key management. Encrypted data (e.g., a file system or any other data structure or group of data) may be operated upon by an application. The application may be executed within a secure enclave. In general, a secure enclave may refer to a protected address space of a memory that is provided by a processor. For example, a server may execute the application within a secure enclave provided by the processor. The secure enclave may further store data that is accessed by the application within the secure enclave. Furthermore, the secure enclave may be provided based on the utilization of a private cryptographic key that is internal to the processor. The application and the data that the application operates upon may thus operate within the secure enclave. When not being used by the application, the data may be encrypted based on the private cryptographic key that is internal to the processor. For example, the private cryptographic key or another cryptographic key that is derived based on the private cryptographic key (e.g., based on a combination of the internal private cryptographic key and an identification of the secure enclave) may be used to encrypt the data. Such a cryptographic key may be referred to as a sealing key.

As previously described, the secure enclave may be provided based on the private cryptographic key that is internal to the processor. For example, an application may be provided on a first server and may utilize a first sealing key of a processor of the first server to encrypt and/or decrypt the data used by the application. In a network environment, the data may be utilized on multiple servers. For example, at a first time, the application may be provided on the first server and may operate on the data within a secure enclave of the first server. Subsequently, a second server may be needed to provide the same application that is to operate on the same underlying data (e.g., the same file system). However, if the data (e.g., the file system) used by the application is encrypted by the first sealing key that is based on the private cryptographic key that is internal to the processor of the first server, then the second server in the network environment may not be able to decrypt the data and utilize the data at the application provided in another secure enclave since the processor of the second server is different than the processor of the first server and thus also includes different private cryptographic keys that are internal to the processor of the second server. Thus, the secure enclave of the processor of the first server that is used to protect the data may prevent the decryption of the data at the second server.

Aspects of the present disclosure address the above and other deficiencies by managing keys for encrypted data. For example, a file system (or other such data or data structure) may be utilized by an application at a first enclave. The file system may be encrypted based on a first enclave key (i.e., sealing key) of the first enclave. Subsequently, the application that is being provided by a second enclave may request the file system that was used by the application at the first enclave. An enclave manager may securely store and manage cryptographic keys at the first enclave. In response to verifying the request from the application at the second enclave, the enclave manager may decrypt the file system and may subsequently encrypt the file system with a cryptographic key of the second enclave. For example, the enclave manager may encrypt the file system with a public key that corresponds to a private second enclave key of a second processor that provides the second enclave. The encrypted file system may then be provided to the second enclave so that the second application provided by the second enclave may operate on the file system.

Advantages of the present disclosure include, but are not limited to, improved security for data. For example, the data may be securely stored and may be used by different copies or versions of an application provided by different enclaves that utilize different private cryptographic keys that are internal to each respective processor. Thus, a file system, dataset, or other such data or data structure may be securely operated on by applications provided by different secure enclaves.

Figure 1:
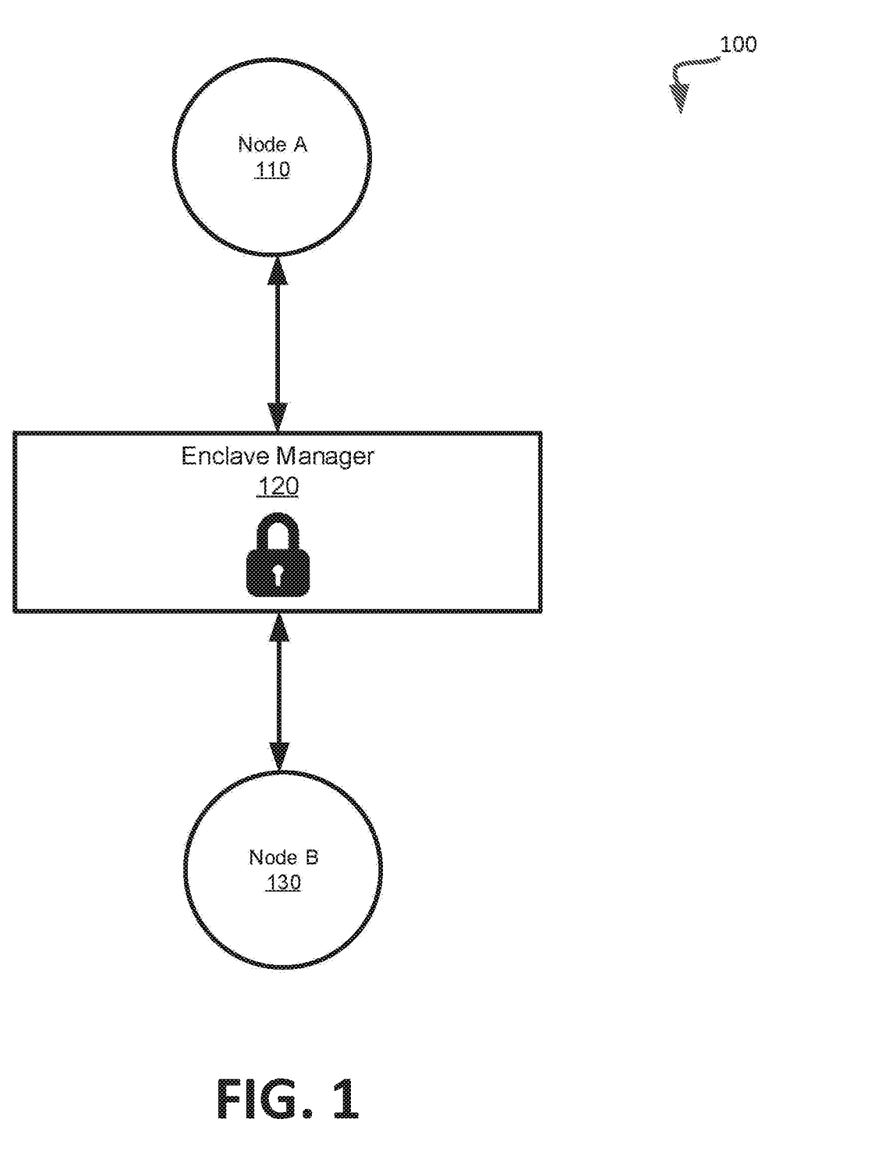
FIG. 1 illustrates an environment to provide encrypted data key management in accordance with some embodiments.

FIG. 1 illustrates an example environment 100 to provide encrypted data key management. In general, the environment 100 may include multiple nodes 110 and 130 and an enclave manager 120.

As shown in FIG. 1, a first node 110 (e.g., Node A) may correspond to a first secure enclave. For example, the first node 110 may represent a first server or a first processor that is providing the first secure enclave. The second node 130 (e.g., Node B) may correspond to a second secure enclave. For example, the second node 130 may represent a second processor that is providing a second secure enclave that is different and separate from the first secure enclave. The second processor may be included in a second server or may be another processor of the first server. The first node 110 and the second node 130 may be different secure enclaves in a distributed networking environment. For example, a network may couple one or more users with the first node 110 and the second node 130. The first node 110 may provide an application (e.g., a virtual machine) that is to operate on data such as a file system. In some embodiments, a use of the application may require that the application be provided on an additional node. For example, a copy of the application may need to be provided by another node to meet or satisfy user demands for the application. Thus, the file system may also be used by another copy of the application that is provided by the second processor of the second secure enclave that is represented by the second node 130. The providing of the file system from the first secure enclave to the second secure enclave is facilitated by the enclave manager 120 as described in further detail below.

Figure 2:
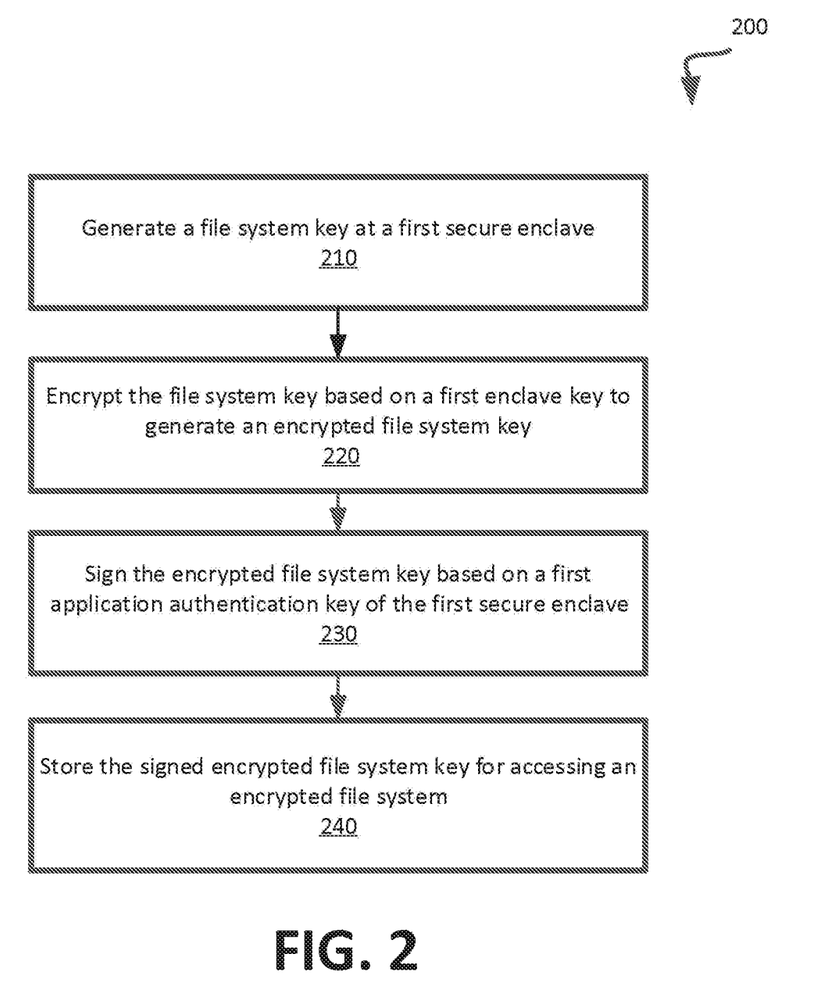
FIG. 2 is a flow diagram of an example method to store an encrypted file system key in accordance with some embodiments of the present disclosure.

FIG. 2 is a flow diagram of an example method 200 to store an encrypted file system key. In general, the method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the enclave manager 120 of FIG. 1.

For simplicity of explanation, the methods of the present disclosure are depicted and described as a series of acts. However, acts in accordance with the present disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 2, the method 200 may begin with processing logic generating a file system key at a first secure enclave (operation 210). The file system key may be generated based on a random value (e.g., an entropy value) that is generated by a processor that is providing or executing the first secure enclave. In some embodiments, an application may perform an attestation operation with an enclave manager to receive a digital certificate that includes one or more public keys. The attestation operation may be initiated at startup or initialization of the application. Furthermore, the application may be considered to be successfully authenticated based on a verification of the application and environment (i.e., first secure enclave) of the application. In response to a successful attestation operation, a digital certificate may be issued or provided to the first secure enclave. The digital certificate may include a public wrapping key of the enclave manager. In some embodiments, the digital certificate may include or be accompanied by additional public keys known to the enclave manager. In some embodiments, the digital certificate may be issued by an intermediary entity (i.e., another server) delegated by the enclave manager. In some embodiments, the file system key may be generated in response to the application creating or accessing data at a first time.

At operation 220, the processing logic may encrypt the file system key based on a first enclave key to generate an encrypted file system key. For example, the generated file system key may be encrypted by using the private cryptographic key that is internal to the processor that is executing or providing the first secure enclave. The private cryptographic key that is internal to the processor may not be transmitted externally or accessible from externally of the processor. The encrypted file system key may be further encrypted by the public wrapping key of the enclave manager. At operation 230, the processing logic may sign the encrypted file system key based on an application authentication key of the first secure enclave. The application authentication key may be a private cryptographic key that is stored within the first secure enclave and that is based on the attestation operation performed by the application. In some embodiments, the corresponding public key of the application authentication key that is used to verify the signature generated by the signature generated from the application authentication key may be included in the digital certificate. At operation 240, the signed encrypted file system key may be stored so that the signed and encrypted file system may be used to access an encrypted file system. For example, a file system that is being operated on by the application may be encrypted by the file system key.

In some embodiments, the signed encrypted file system key may be stored in a key file for the file system. The key file may include one or more cryptographic keys for one or more secure enclaves that have provided applications that access the file system or that are to access the file system. In the same or alternative embodiments, the storing of the signed encrypted file system key may be performed in response to determining that the key file does not presently store an encrypted file system key corresponding to the first secure enclave. For example, if no encrypted file system key that is encrypted based on the internal cryptographic key of the first processor (e.g., a key derived from the internal cryptographic key) providing the first secure enclave is present in the key file, then the encrypted file system key may be generated and stored in the key file for the first secure enclave.

Figure 3:
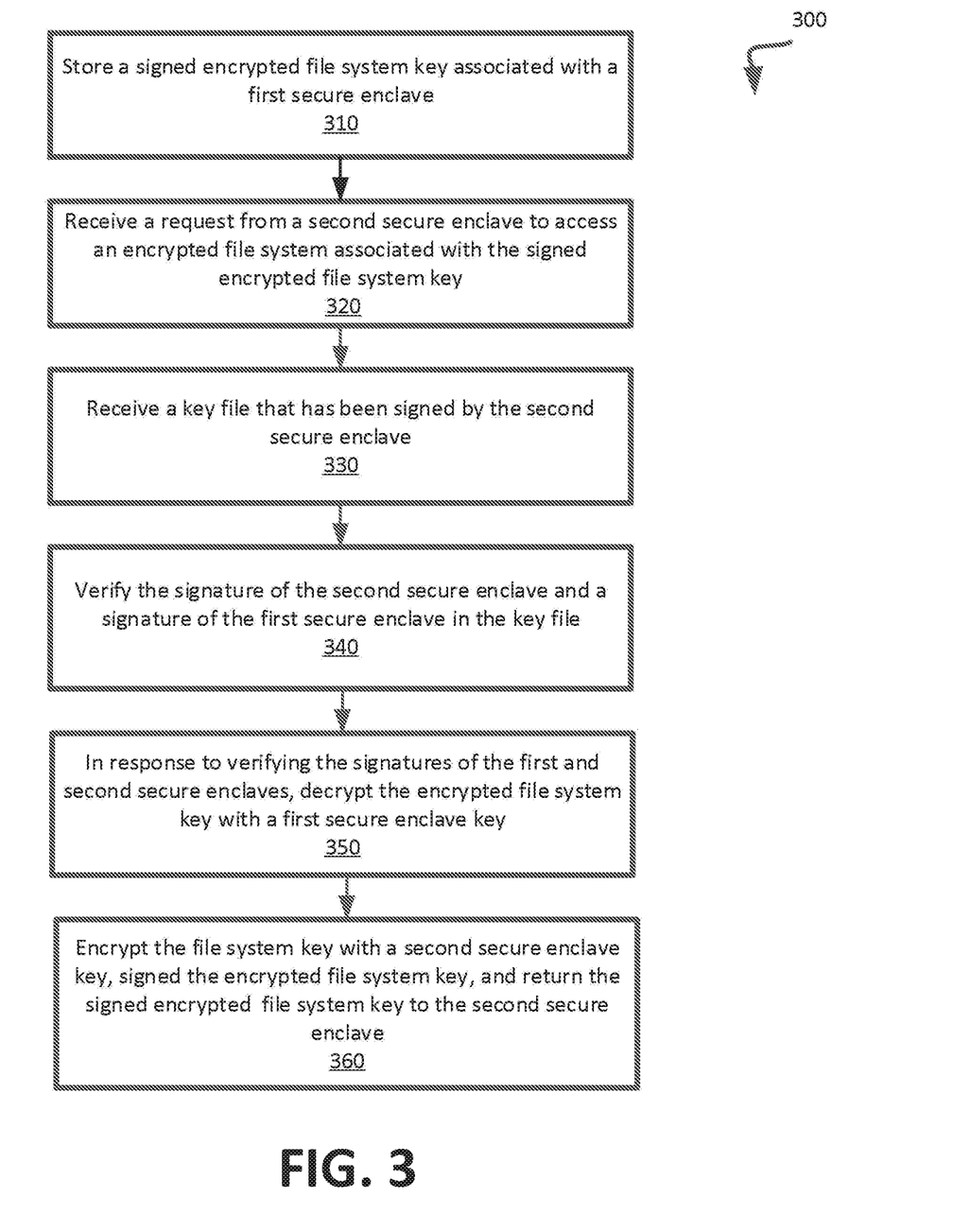
FIG. 3 is a flow diagram of an example method to change an encryption of an encrypted file system key in accordance with some embodiments of the present disclosure.

FIG. 3 is a flow diagram of an example method to change an encryption of an encrypted file system key in accordance with some embodiments of the present disclosure. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the enclave manager 120 of FIG. 1.

As shown in FIG. 3, at operation 310, the processing logic may store a signed encrypted file system key associated with a first secure enclave. For example, a key file of the file system that is being used by an application provided by a first secure enclave may be stored at a server. The key file may include one or more encrypted file system keys from one or more respective secure enclaves. For example, the key file may include multiple file system keys that are used to encrypt a file system (or other such data) that have been accessed by the application at different secure enclaves that are provided by different processing devices. At operation 320, the processing logic may receive a request from a second secure enclave to access an encrypted file system associated with the signed encrypted file system key. For example, the request may be received from another copy of the application that is executed within the second secure enclave that is provided by a different processor than the first secure enclave. In some embodiments, the copy of the application may initiate an attestation operation as previously described. Thus, the application may store a digital certificate within the second secure enclave. The request from the second secure enclave may be received in response to the second secure enclave or application of the second secure enclave determining that the key file does not presently store an encrypted file system key that has been generated by the internal cryptographic key of the second processor providing the second secure enclave.

At operation 330, the processing logic may receive a key file that has been signed by the second secure enclave. The key file may be received by the enclave manager from the second secure enclave. In some embodiments, the key file may be received with an application key wrapping certificate of the second application provided by the second secure enclave. The application key wrapping certificate may be signed by the second application. In some embodiments, the application key wrapping certificate may also be signed by an enclave manager or a delegate of the enclave manager. At operation 340, the processing logic may verify the signature of the second secure enclave and a signature of the first secure enclave in the key file. For example, the signature of the second secure enclave may be verified from the application key wrapping certificate and the signature of the first secure enclave may be verified from the signed encrypted file system key associated with the first secure enclave that is present in the key file. In some embodiments, the signature of the application of the first secure enclave may be verified from an application key authentication certificate of the first application that is provided by the first secure enclave. For example, the application key authentication certificate may include a public key that is used to verify a signature generated by a corresponding private key.

In response to verifying the signatures of the first and second secure enclaves, the processing logic may, at operation 350, decrypt the encrypted file system key. For example, the encrypted file system key may be the file system key that has been encrypted based on a first secure enclave key. The encrypted file system key may be decrypted by the private key that corresponds to the public key included in the enclave manager key wrapping certificate. Subsequently, at operation 360, the processing logic may encrypt the file system key with a second secure enclave key, sign the encrypted file system key by a private cryptographic key of the enclave manager, and return the signed encrypted file system key to the second secure enclave. The second secure enclave key may be a public key from the application key wrapping certificate from the second application and/or second secure enclave. The signature may be generated by the private key of the enclave manager where the corresponding public key is received by the application of the second secure enclave during the attestation operation when the digital certificates are received. Thus, the file system key may be re-encrypted or wrapped based on the second secure enclave key.

As such, the enclave manager may manage the encrypted file system keys for a file system or other such data. The enclave manager may receive a request from a second secure enclave to access a file system that has been encrypted by a first secure enclave. The enclave manager may decrypt the encrypted file system key based on a cryptographic key of the first secure enclave and may encrypt the file system key based on a cryptographic key of the second secure enclave. Thus, the encryption of the file system key may be changed and the changed encrypted file system key may be provided to the second secure enclave.

In some embodiments, one or more policies can be used to specify when an encrypted file system key can be decrypted by the enclave manager. For example, the policies may specify when the enclave manager is to use the private key corresponding to the public key that is included in the enclave manager key wrapping certificate. The policies may be specified by the application at the first secure enclave. An example of a policy is that particular entities may decrypt the encrypted file system key. For example, the encrypted file system key may be decrypted in response to a request from specific nodes or secure enclaves or applications and may not be decrypted by other nodes or secure enclaves or applications. The encrypted file system key may be decrypted in response to a verification of a particular signature of the requesting application. Another policy is that the encrypted file system key may be decrypted in response to a request from a particular version of the application that is provided by a secure enclave. For example, versions of the application that are a particular version number or higher may result in the encrypted file system key to be decrypted by the enclave manager and then encrypted based on the secure enclave providing the application while versions of the application that do not satisfy a version number condition (e.g., are less than the particular version number) may result in the encrypted file system key not being decrypted.

In some embodiments, the policy may specify a time when the encrypted file system key may be decrypted by the enclave manager. In the same or alternative embodiments, the policy may specify a total number of other secure enclaves that the enclave manager may decrypt the encrypted file system key for and encrypt the file system key for the corresponding total number of other secure enclaves. In some embodiments, the policy may specify a total number of other secure enclaves that the enclave manager may decrypt the encrypted file system key for during a particular period of time.

In some embodiments, if an application requests the file system key but the enclave manager does not decrypt the file system key, then an error message may be provided to the secure enclave of the application to indicate that the encrypted file system key was not decrypted by the enclave manager. In some embodiments, the error message may indicate information specifying why the encrypted file system key was not decrypted (e.g., due to a particular policy).

Figure 4:
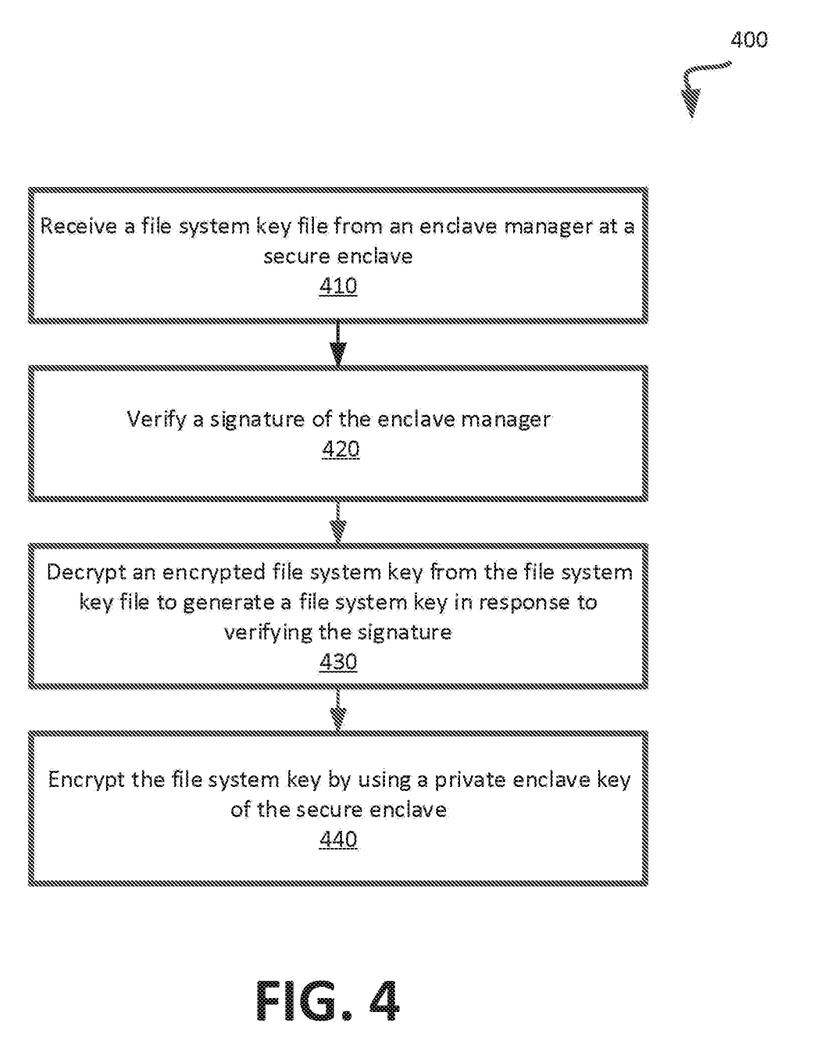
FIG. 4 is a flow diagram of an example method to utilize an encrypted file system key received from the enclave manager in accordance with some embodiments of the present disclosure.

FIG. 4 is a flow diagram of an example method to utilize an encrypted file system key received from the enclave manager in accordance with some embodiments of the present disclosure. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the enclave manager 120 of FIG. 1.

As shown in FIG. 4, at operation 410, the processing logic may receive a file system key file from an enclave manager and at a secure enclave. At operation 420, the processing logic may verify a signature of the enclave manager. For example, the file system key file may be signed by the enclave manager. The secure enclave that has received the file system key file may have previously received a digital certificate in response to an attestation operation as previously described. The signature of the enclave manager may be verified by a public key that is included in the digital certificate. At operation 430, the processing logic may decrypt an encrypted file system key from the file system key file in response to verifying the signature of the enclave manager. For example, the encrypted file system key may be identified from the file system key file. The encrypted file system key may be decrypted by using the private key that corresponds to the public key from the application key wrapping certificate from an application of the secure enclave. At operation 440, the processing logic may encrypt the file system key by using a private enclave key (i.e., a sealing key) of the secure enclave. The encrypted file system key may then be stored at the secure enclave and used to decrypt and encrypt a file system to be used by an application at the secure enclave. The private enclave key can be an internal cryptographic key of a processor providing the secure enclave or can be derived based on the internal cryptographic key of the processor and identification information of the secure enclave.

Figure 5:
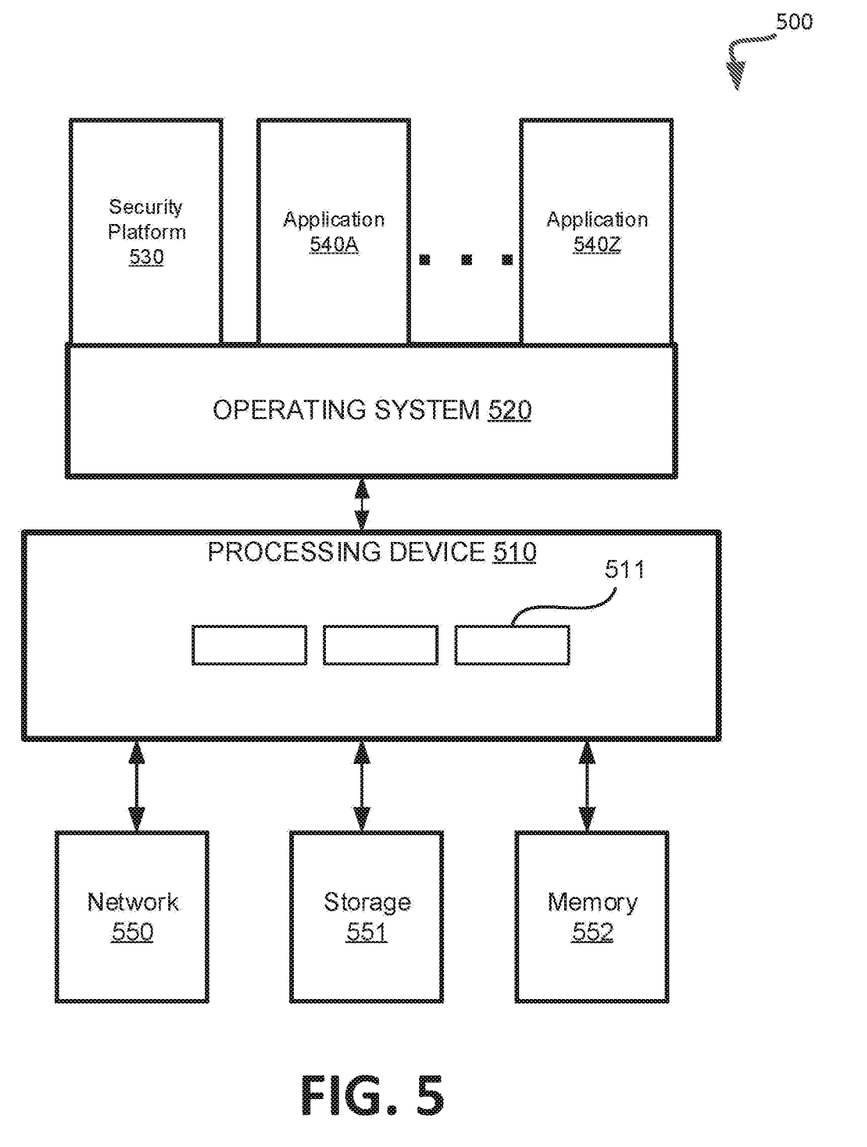
FIG. 5 illustrates an example server that provides encrypted data key management in accordance with some embodiments of the present disclosure.

FIG. 5 illustrates an example server that provides encrypted data key management. In general, the nodes 110 or 130 or the enclave manager 130 of FIG. 1 may correspond to a network server that provides cryptographic operations for one or more other applications 540A to 540Z that are also hosted by the network server or another network server.

As shown in FIG. 5, the network server 500 may include a processing device 510 that may execute an operating system 520. Furthermore, the processing device 510 may include one or more internal cryptographic keys 511 that may be used to encrypt and decrypt data stored in a portion of a memory that is assigned to a secure enclave associated with a security platform 530. The access to the data of the security platform 530 in the secure enclave (e.g., data stored at a storage resource) may be protected from the one or more applications 540A to 540Z and the operating system 520. For example, the access to the data of the secure enclave corresponding to the security platform 530 may be protected by the use of one of the internal cryptographic keys 511 (e.g., the secure enclave key or a master key) that are internal to the processing device 510 so that the access to the data is based on a hardware access as opposed to a software access. The operating system 520 may be associated with a first privilege level and the security platform 530 and the applications 540A to 540Z may be associated with a second privilege level where the first privilege level of the operating system is more privileged than the second privilege level of the various applications that are run on the operating system 520 (e.g., the more privileged level allows access to more resources of the network server than the less privileged level). Thus, the operating system 520 may be allowed access to resources of the applications 540A to 540Z. However, since the security platform 530 is assigned to a secure enclave where access to the data of the secure enclave is based on the use of an internal cryptographic key 511 of the processing device 511, the operating system 520 may not be able to access the data of the security platform 530 despite having a more privileged level of access than the security platform 530. The master key that is used to decrypt data at the storage resource may be an internal cryptographic key 511.

In operation, the security platform 530 may be hosted on the network server with the applications 540A to 540Z. The application 540A may perform a function that may use a cryptographic operation with a cryptographic key. In order to securely store the cryptographic key and perform the cryptographic operation securely, the application 540A may establish a connection with a key management system of the server. The key management system may correspond to functionality of the security platform 530. For example, an attestation procedure may be performed by the application 540A to authenticate the key management system. After the key management system has been authenticated, a connection may be considered to be established between the application 540A and the key management system. The cryptographic key of the application 540A (e.g., used by cryptographic operation) may be provided to the key management system. Since the key management system is assigned to a secure enclave, the data of the key management system may be encrypted and protected by the use of an internal cryptographic key 511 (i.e., the master key) of the processing device 510. For example, the key management system may receive the cryptographic key of the application 540A and may transmit an instruction to the processing device 510 to store the received cryptographic key in the memory of its assigned secure enclave. In some embodiments, the key management system may transmit identification information of the key management system to the processing device 510 for the processing device 510 to load the received cryptographic key from the application 540A in the secure enclave of the key management system. The processing device 510 may use an instruction to use one of its internal cryptographic keys 511 that is based on the identification of the key management system to store the received cryptographic key in the memory of the secure enclave of the key management system. For example, the received cryptographic key may be securely (e.g., encrypted) stored in the storage 551 or memory 552 associated with the processing device 510 or at another storage resource over a network 550 (e.g., at a storage device of the storage resource). In some embodiments, one of the applications 540A to 540Z may provide a request to the key management system to generate a cryptographic key to be used in a cryptographic operation for the respective application 540A to 540Z. For example, the key management system may generate the cryptographic key and may store the cryptographic key in its memory of the secure enclave.

After the cryptographic key of the application 540A has been loaded in the secure enclave, the application 540A may subsequently request that an encrypted file system key be decrypted to obtain a file system key that is subsequently re-encrypted based on a public key of the application 540A. For example, the application 540A may provide a request to the enclave manager to change an encryption of an encrypted file system key. Subsequently, the method 300 of FIG. 3 may be performed by an enclave manager. In some embodiments, the enclave manager may correspond to the security platform 530. In some embodiments, the internal cryptographic key 511 may be combined with additional information (e.g., the identification information of the key management system) to generate the master key for the key management system that is used to decrypt and/or encrypt data associated with the secure enclave of the key management system. Thus, since the processing device 510 uses its internal cryptographic key 511 to decrypt data and to perform the cryptographic operation, the cryptographic key received from the application may not be exposed external to the processing device 510.

As such, a network server may run a key management system and an application that may use the key management system for providing encrypted data key management as described herein. Although FIG. 5 illustrates that the key management system may provide secure key management for an application 540A to 540Z on the same network server, the key management system may alternatively be hosted by another network server or may be hosted by another network server that is external to any data center or network cluster that includes the network servers hosting applications 540A to 540Z.

Figure 6:
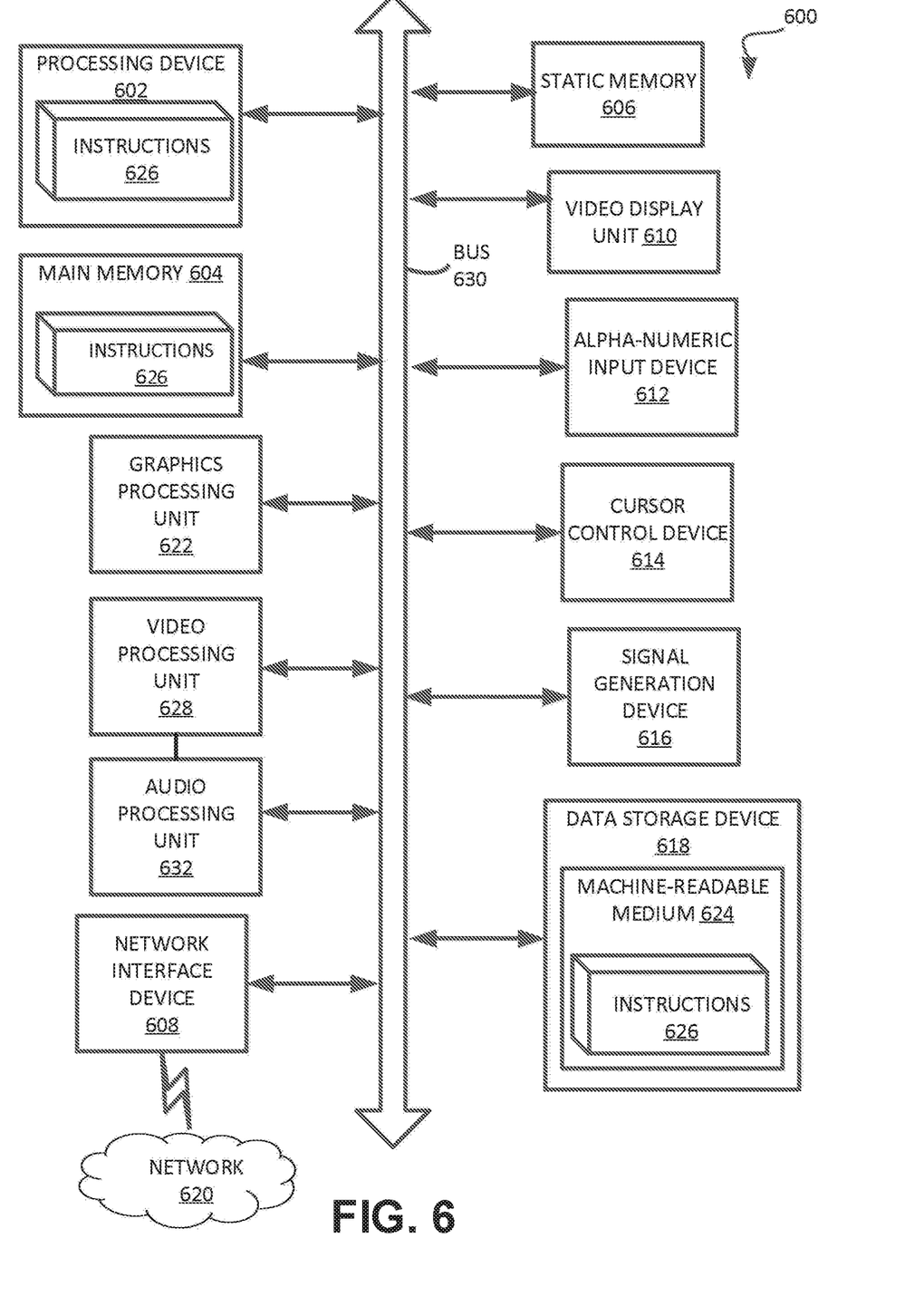
FIG. 6 illustrates an example computer system in which embodiments of the present disclosure operate.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 708 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality as described herein. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing certain terms may refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
receiving an encrypted file system key associated with a first secure enclave;
receiving a request from a second secure enclave to access a file system associated with the encrypted file system key;
receiving a policy associated with the encrypted file system key;
determining whether the second secure enclave satisfies one or more conditions associated with the policy;
in response to receiving the request and further in response to determining that the second secure enclave satisfies the one or more conditions, decrypting the encrypted file system key with a private cryptographic key associated with an enclave manager to obtain a file system key, wherein the private cryptographic key corresponds to a public key included in an enclave manager key wrapping certificate, and wherein the enclave manager key wrapping certificate is provided to the first secure enclave as a result of a first attestation operation performed with the enclave manager;
receiving, from the second secure enclave, an application key wrapping certificate;
encrypting, by a processing device, the file system key based on a public cryptographic key associated with the second secure enclave to generate a re-encrypted file system key, wherein the public cryptographic key is from the application key wrapping certificate; and
providing the re-encrypted file system key to the second secure enclave.

2. The method of claim 1, wherein the re-encrypted file system key is used to utilize the file system at the second secure enclave.

3. The method of claim 1, further comprising:
verifying a signature of the second secure enclave in response to receiving the request, wherein the decrypting of the encrypted file system key is further in response to verifying the signature of the second secure enclave.

4. The method of claim 1, further comprising:
signing the re-encrypted file system key with a private key that is associated with the enclave manager, wherein re-encrypted file system key that is signed is provided to the second secure enclave.

5. The method of claim 1, wherein the encrypted file system key associated with the first secure enclave corresponds to a particular file system key that is derived based on a first secure enclave key of the first secure enclave.

6. The method of claim 5, wherein the particular file system key is an internal cryptographic key of a processor that is providing the first secure enclave and is not accessible by the second secure enclave.

7. A system comprising:
a memory; and
a processing device, operatively coupled with the memory, to:
receive an encrypted file system key associated with a first secure enclave;
receive a request from a second secure enclave to access a file system associated with the encrypted file system key;
receive a policy associated with the encrypted file system key;
determine whether the second secure enclave satisfies one or more conditions associated with the policy;
in response to receiving the request and further in response to determining that the second secure enclave satisfies the one or more conditions, decrypt the encrypted file system key with a private cryptographic key associated with an enclave manager to obtain a file system key, wherein the private cryptographic key corresponds to a public key included in an enclave manager key wrapping certificate, and wherein the enclave manager key wrapping certificate is provided to the first secure enclave as a result of a first attestation operation performed with the enclave manager;
receive, from the second secure enclave, an application key wrapping certificate;
encrypt the file system key based on a public cryptographic key associated with the second secure enclave to generate a re-encrypted file system key, wherein the public cryptographic key is from the application key wrapping certificate; and
provide the re-encrypted file system key to the second secure enclave.

8. The system of claim 7, wherein the re-encrypted file system key is used to utilize the file system at the second secure enclave.

9. The system of claim 7, wherein the processing device is further to:
verify a signature of the second secure enclave in response to receiving the request, wherein the decrypting of the encrypted file system key is further in response to verifying the signature of the second secure enclave.

10. The system of claim 7, wherein the one or more conditions are associated with an identification of an application provided by the second secure enclave.

11. The system of claim 7, wherein the encrypted file system key associated with the first secure enclave corresponds to a particular file system key that is derived based on a first secure enclave key of the first secure enclave.

12. The system of claim 11, wherein the particular file system key is an internal cryptographic key of a processor that is providing the first secure enclave and is not accessible by the second secure enclave.

13. A non-transitory computer readable medium comprising data that, when accessed by a processing device, cause the processing device to perform operations comprising:
- receiving an encrypted file system key associated with a first secure enclave;
- receiving a request from a second secure enclave to access a file system associated with the encrypted file system key;
- receiving a policy associated with the encrypted file system key;
- determining whether the second secure enclave satisfies one or more conditions associated with the policy;
- in response to receiving the request and further in response to determining that the second secure enclave satisfies the one or more conditions, decrypting the encrypted file system key with a private cryptographic key associated with an enclave manager to obtain a file system key, wherein the private cryptographic key corresponds to a public key included in an enclave manager key wrapping certificate, and wherein the enclave manager key wrapping certificate is provided to the first secure enclave as a result of a first attestation operation performed with the enclave manager;
- receiving, from the second secure enclave, an application key wrapping certificate;
- encrypting the file system key based on a public cryptographic key associated with the second secure enclave to generate a re-encrypted file system key, wherein the public cryptographic key is from the application key wrapping certificate; and
- providing the re-encrypted file system key to the second secure enclave.

14. The non-transitory computer readable medium of claim 13, wherein the re-encrypted file system key is used to utilize the file system at the second secure enclave.

15. The non-transitory computer readable medium of claim 13, the operations further comprising:
- verifying a signature of the second secure enclave in response to receiving the request, wherein the decrypting of the encrypted file system key is further in response to verifying the signature of the second secure enclave.

16. The non-transitory computer readable medium of claim 13, wherein the one or more conditions are associated with an identification of an application provided by the second secure enclave.

17. The non-transitory computer readable medium of claim 13, wherein the encrypted file system key associated with the first secure enclave corresponds to a particular file system key that is derived based on a first secure enclave key of the first secure enclave.

* * * * *